(12) United States Patent
Sahlgren

(10) Patent No.: US 7,099,537 B2
(45) Date of Patent: Aug. 29, 2006

(54) SYSTEM AND METHOD FOR FABRICATING BRAGG GRATINGS

(75) Inventor: Bengt Sahlgren, Saltsjö-Boo (SE)

(73) Assignee: Proximion Fiber Systems AB, Kista (SE)

( * ) Notice: Subject to any disclaimer, the term of this patent is extended or adjusted under 35 U.S.C. 154(b) by 0 days.

(21) Appl. No.: 10/471,027

(22) PCT Filed: Mar. 6, 2002

(86) PCT No.: PCT/SE02/00385

§ 371 (c)(1),
(2), (4) Date: Aug. 26, 2004

(87) PCT Pub. No.: WO02/071113

PCT Pub. Date: Sep. 12, 2002

(65) Prior Publication Data

US 2005/0008293 A1    Jan. 13, 2005

(30) Foreign Application Priority Data

Mar. 8, 2001    (SE) ................................. 0100789

(51) Int. Cl.
*G02B 6/26* (2006.01)

(52) U.S. Cl. ............................................... 385/37
(58) Field of Classification Search .................. 385/37
See application file for complete search history.

(56) References Cited

U.S. PATENT DOCUMENTS

| | | | |
|---|---|---|---|
| 5,016,951 A * | 5/1991 | Deason et al. ............... 359/10 |
| 5,042,897 A * | 8/1991 | Meltz et al. ................. 385/37 |
| 5,708,738 A * | 1/1998 | Perez et al. .................. 385/37 |
| 5,881,186 A * | 3/1999 | Starodubov ................. 385/37 |
| 6,297,894 B1 * | 10/2001 | Miller et al. ................ 359/35 |
| 6,548,225 B1 * | 4/2003 | Hammon et al. ........... 430/321 |
| 6,549,705 B1 * | 4/2003 | Laming et al. .............. 385/37 |
| 6,898,350 B1 * | 5/2005 | Iler et al. .................... 385/37 |
| 6,904,201 B1 * | 6/2005 | St. Hilaire et al. .......... 385/37 |
| 2003/0035627 A1 * | 2/2003 | Labidi et al. ................ 385/37 |

FOREIGN PATENT DOCUMENTS

| | | |
|---|---|---|
| EP | 0978738 | 2/2000 |
| WO | 9721120 | 6/1997 |

* cited by examiner

*Primary Examiner*—Sung Pak
(74) *Attorney, Agent, or Firm*—Harness, Dickey & Pierce, P.L.C.

(57) ABSTRACT

A novel method and apparatus for fabrication of blazed and slanted fiber Bragg gratings is disclosed. The method comprises the step of simultaneously exposing the fiber with two mutually coherent light beams so as to create an interference pattern along a longitudinal axis of the fiber, wherein each one of said beams is brought into a line focus, which coincides with the core of the fiber. Further, the plane comprising the beams is rotated to provide a second angle relative to the fiber direction, said rotation giving rise to a blazing angle of the photo-induced grating elements.

26 Claims, 3 Drawing Sheets

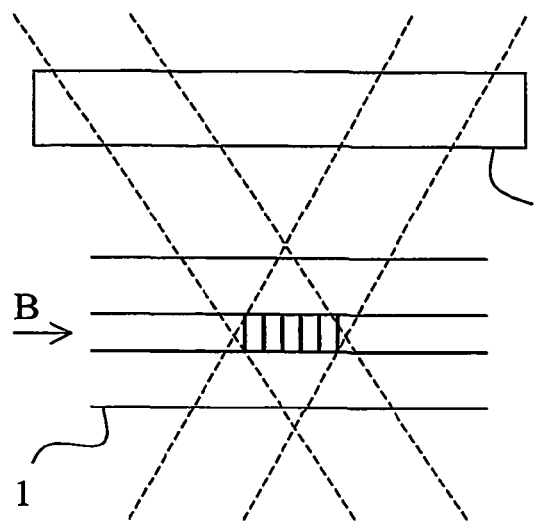
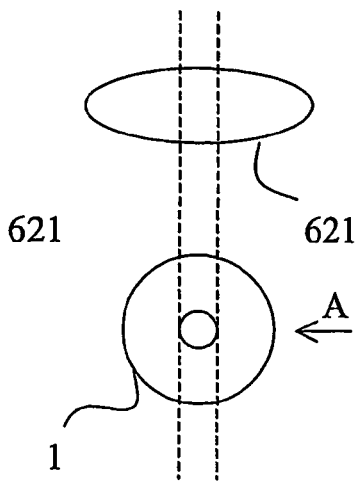
Fig 2a    Fig 2b
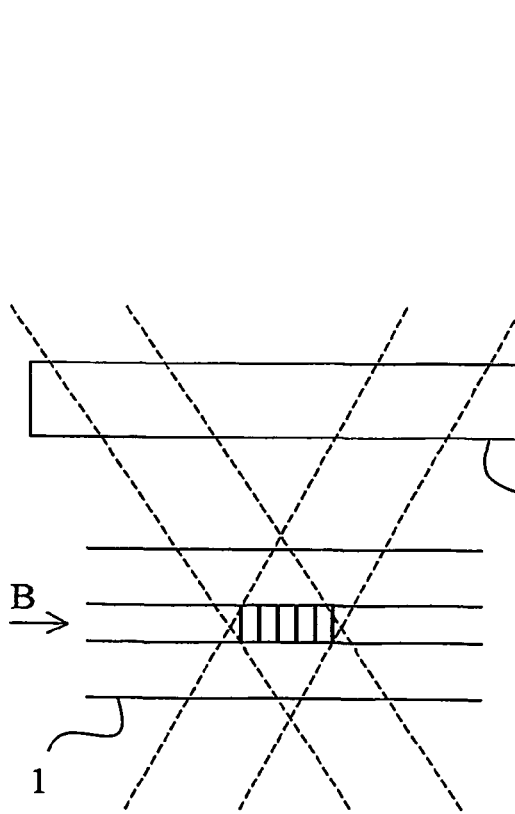
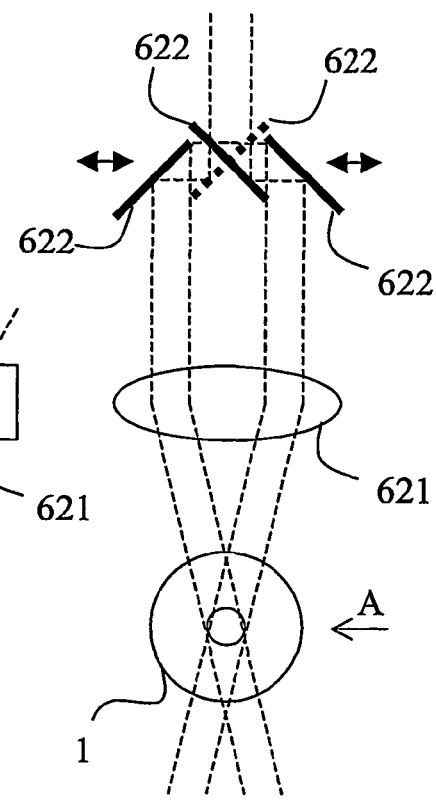
Fig 3a    Fig 3b

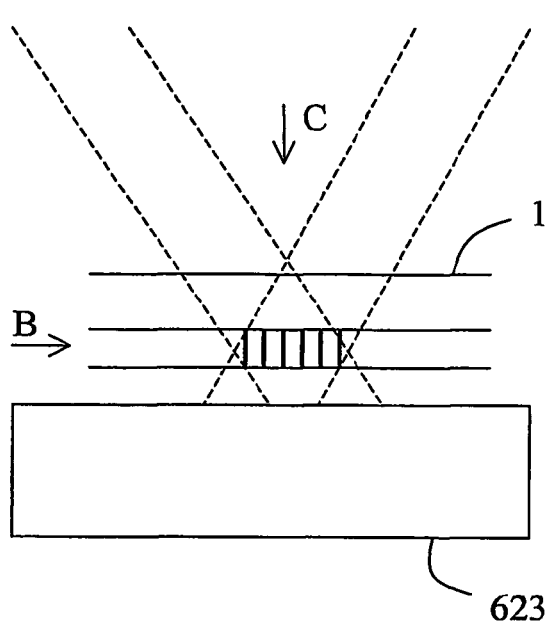
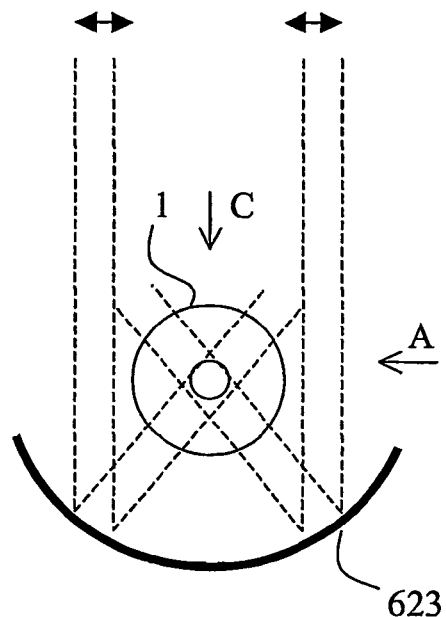
Fig 4a　　　　　　　　Fig 4b
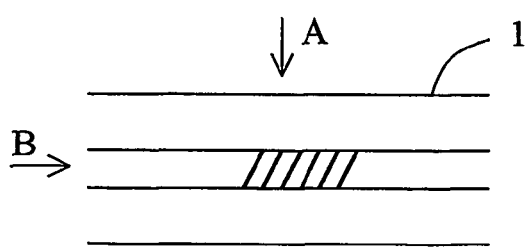
Fig 4c

SYSTEM AND METHOD FOR FABRICATING BRAGG GRATINGS

FIELD OF THE INVENTION

The present invention relates to a method for photo-inducing a blazed grating in an optical fiber comprising the step of simultaneously exposing the fiber with two mutually coherent light beams, which intersects with an first angle in a plane comprising the beams and interfere in a predetermined region of the fiber so as to create an interference pattern along a longitudinal axis of the fiber. The invention further relates to an apparatus for performing the method.

BACKGROUND OF THE INVENTION

There is a rapidly growing demand for high-quality optical Bragg gratings with arbitrary phase and index profiles, as these gratings are key elements in many components that are used in WDM networks. Over the past few years, several methods that improve the quality and the flexibility in the grating fabrication process have been developed. A straightforward approach is to scan a UV beam over a long phase mask in a fixed relative position to the fiber. Non-uniform profiles can in this case be fabricated either by post processing the illuminated region or by using a phase mask that contains the appropriate structure. Complex grating structures can also be synthesized by moving the fiber slightly relative to the phase mask during the scan.

In 1995, a novel versatile sequential technique for venting long and complex fiber gratings was demonstrated by R. Stubbe, B. Sahlgren, S. Sandgren and A. Asseh, in "Novel technique for writing long superstructured fiber Bragg gratings", in Photosensitivity and Quadratic Nonlinearity in Glass Waveguides (Fundamentals and Applications), Portland, PD1 (1995) and by A. Asseh, H. Storøy, B. E. Sahlgren, S. Sandgren and R. A. H. Stubbe, in "A writing technique for long fiber Bragg gratings with complex reflectivity profiles", J. Lightw. Techn. 15, 1419–1423 (1997). The idea was to expose a large number of small partially overlapping subgratings—each containing a few hundred periods or less—in sequence; where advanced properties such as chirp, phase shifts and apodization were introduced by adjusting the phase offset and pitch of the subgratings. In the setup that was used in the above-mentioned references, each subgrating was created by exposing the fiber with a short UV pulse while the fiber itself was translated at a constant speed. The UV pulses were triggered by the position of the fiber relative the UV beams, which was measured by a standard helium-neon laser interferometer.

Bragg gratings normally have their grating elements aligned normal to the waveguide axis. However, there is an increasing interest in producing gratings which have their elements at an angle to the waveguide axis, known as blazed Bragg gratings. Such blazed Bragg gratings are difficult to fabricate efficiently and with appropriate precision with previously know methods and apparatuses.

For example, U.S. Pat. No. 5,730,888 and U.S. Pat. No. 5,042,897 both relates to methods and apparatuses to photo-induce blazed gratings in optical fibers. The blazed gratings are formed by tilting the projection system relative to the fiber. However, there are several problems with these known methods. To be able to tilt the projection system relative to the fiber the equipment becomes complex and costly. Further, it is difficult to achieve an adequate focus on the fiber in the whole exposure area. Hereby, the known methods becomes slow and inefficient, with a low through-put. Still further, with the known methods it is only possible to produce blazed gratings with a limited blazing angle, whereas blazed gratings with larger angles of inclination is very complicated to produce, or even not possible to produce at all.

SUMMARY OF THE INVENTION

It is therefore an object of the present invention to provide a method and an apparatus for photo-inducing a blazed grating in an optical fiber, which alleviates the above-mentioned problems of the prior art.

This object is achieved with an apparatus and a method as defined in the appended claims.

According to the invention there is provided a method for photo-inducing a blazed grating in an optical fiber comprising the step of simultaneously exposing the fiber with two mutually coherent light beams, which intersects with an first angle in a plane comprising the beams and interfere in a predetermined region of the fiber so as to create an interference pattern along a longitudinal axis of the fiber. Further, each one of said beams is brought into a line focus, which coincides with the core of the fiber.

The invention presents a novel method for fabrication of advanced blazed fiber Bragg gratings. As opposed to prior art methods, the method according to the invention does not tilt the projection system relative to the fiber, but provides a blazed interference pattern in line focus with the fiber.

Especially, the method could be used when said plane comprising the beams, at least in the vicinity of the fiber, is rotated to provide a second angle relative to the fiber direction, said rotation giving rise to a blazing angle of the photo-induced grating elements.

According to the inventive method, a blazing angle could be chosen arbitrarily, without any equipment restrictions. Further, the quality and precision of the photo-induced pattern is improved, since the line focus coincides with the fiber even at large blazing angles. Still further, the control of the fabrication process becomes simplified, rendering the fabrication more efficient and less costly, and with a shortening of fabrication times for complex gratings.

Light is in the context of the application not limited to mean visible light, but a wide range of wavelengths from infrared (IR) to extreme UV.

Further, with optical fiber is in the meaning of this application to be understood any kind of optical waveguide made of a material which has a refractive index that can be permanently changed by exposure to light of at least one predetermined wavelength.

By photo-induction is to be understood the process of exposing the optical fiber of the above-mentioned type with light of the predetermined wavelength so as to form a permanent refractive index variation in the fiber.

According to one embodiment of the invention, the beams are focused on the fiber by means of at least one lens and the rotation of the beam plane is achieved by displacement of at least one of the beam incidence positions on said lens. The beam incidence position could preferably be displaced in a direction essentially perpendicular to the fiber direction. Hereby, the beams could be displaced on the lens, and still be focused on the fiber. Hence, the angle of incidence relative to the fiber could be varied without affecting the focus.

In an alternative embodiment, the beams are focused on the fiber by means of at least one curved mirror and rotation of the beam plane is achieved by displacement of at least one of the beam incidence positions on said mirror. The beam incidence position is preferably displaced in a direction essentially perpendicular to the fiber direction. Hereby, the beams could be displaced on the mirror, and still be focused on the fiber. Hence, the angle of incidence relative to the fiber could be varied without affecting the focus even in this embodiment.

The invention also relates to an apparatus for photo-inducing a blazed grating in an optical fiber comprising a source for emitting light; a beam splitter for forming two mutually coherent light beams; a fiber holder for holding the fiber during exposure; and a projection system for making the beams intersect with a first angle in the exposure area and thereby to interfere in a predetermined region of the fiber so as to create an interference pattern along the longitudinal axis of the fiber. The projection system further comprises means for focusing the beams so that each one of said beams is brought into a line focus, which coincides with the core of the fiber.

With this apparatus, the method discussed above could be executed. Accordingly, a novel apparatus is presented for fabrication of advanced blazed fiber Bragg gratings. As opposed to prior art equipment, the apparatus according to the invention does not tilt the projection system relative to the fiber, but provides a blazed interference pattern in line focus with the fiber.

Especially, the means for focussing the beams could further comprise means for rotating the plane comprising the two light beams relative to the fiber, at least in the vicinity of the fiber, to provide a second angle relative to the fiber direction, said rotation giving rise to a blazing angle of the photo-induced grating elements.

According to the invention, a blazing angle could be chosen arbitrarily, without any equipment restrictions. Further, the quality and precision of the photo-induced pattern is improved, since the line focus coincides with the fiber even at large blazing angles. Still further, the control of the fabrication process becomes simplified, rendering the fabrication more efficient and less costly, and with a shortening of fabrication times for complex gratings.

In one embodiment, the means for focussing the beams comprises at least one lens for focusing the beams on the fiber, the means for rotating the beam plane comprising means for displacing the beam incidence position on said lens for at least one of the beams. The beam incidence position is preferably displaced in a direction essentially perpendicular to the fiber direction. Hereby, the beams could be displaced on the lens, and still be focused on the fiber. Hence, the angle of incidence relative to the fiber could be varied without affecting the focus.

The means for displacing the beam incidence position could comprise at least one displaceable or rotatable reflecting mirror arranged in the beam path for said beam, and preferably allowing parallax displacement of the beams.

In an alternative embodiment, the means for focusing the beams comprises at least one curved mirror, and means for rotating the beam plane comprising means for displacing the beam incidence position on said mirror for at least one of the beams. The beam incidence position is preferably displaced in a direction essentially perpendicular to the fiber direction. Hereby, the beams could be displaced on the mirror, and still be focused on the fiber. Hence, the angle of incidence relative to the fiber could be varied without affecting the focus even in this embodiment.

BRIEF DESCRIPTION OF THE DRAWINGS

For exemplifying purposes, the invention will be described in closer detail in the following with reference to embodiments thereof illustrated in the attached drawings, wherein:

FIG. 2 is a schematic drawing of a projection system in the exposure area according to a first embodiment of the invention with the beams not being displaced, where FIG. 2a is seen perpendicular to the fiber and 2b is seen in the longitudinal direction of the fiber.

FIG. 3 is a schematic drawing of the projection system in FIG. 2, but where the beams are displaced, where FIG. 3a is seen perpendicular to the fiber and 3b is seen in the longitudinal direction of the fiber.

FIG. 4 is a schematic drawing of a projection system in the exposure area according to a second embodiment of the invention, where FIG. 4a is seen perpendicular to the fiber, 4b is seen in the longitudinal direction of the fiber, and 4c is a side view from a direction perpendicular to the view in 4a.

DESCRIPTION OF PREFERRED EMBODIMENTS

Figure 1:
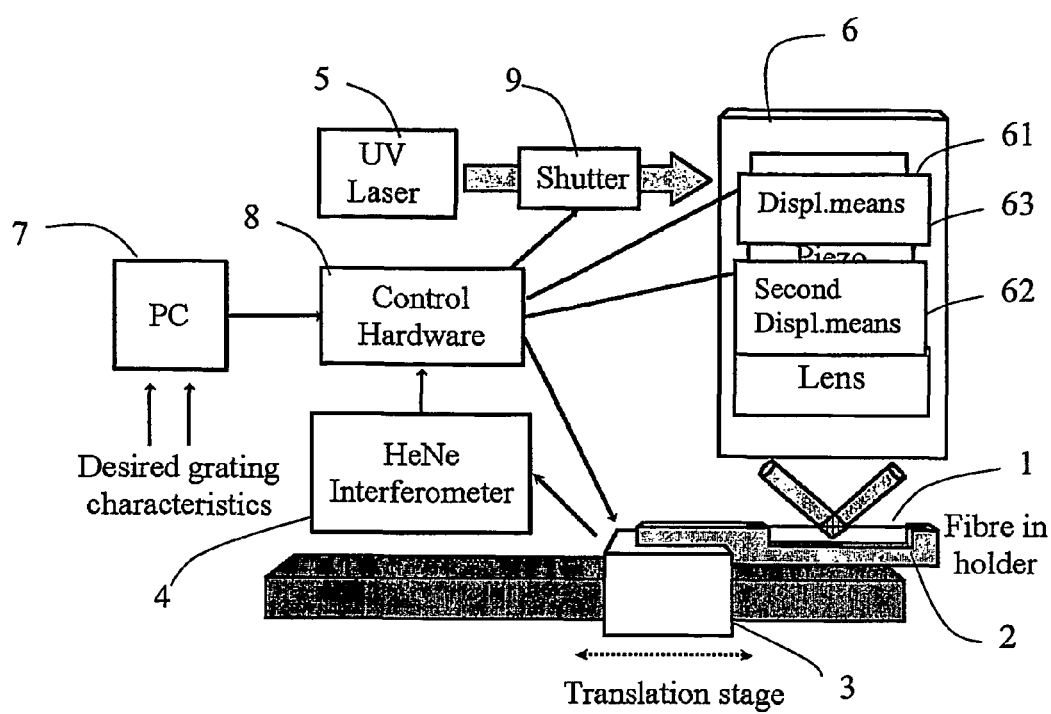
FIG. 1 is a schematic drawing of a fiber Bragg grating fabrication system according to an embodiment according to the invention.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The setup according to an embodiment of the invention is illustrated in FIG. 1. The base for the system according to the invention could e.g. be a system as described in "Fiber Bragg Gratings" by Raman Kashyap, p. 55–101. Especially the system described with reference to FIG. 3.21 serves as a good base. This description is hereby incorporated by reference.

However, other types of photo-inducing systems are conceivable for the invention. A system according to the invention comprises in general a light source, a beam splitter of any kind, a projection system and a fiber holder. The projection system could preferably comprise a mirror arrangement, and sees to that the beams interfere with another in an exposure area so as to form a interference pattern in the fiber and hence corresponding grating elements. The light source could be a continuous or pulsed wave laser. When a pulsed laser is used, the laser is preferably actuated when the distance moved by the fiber equals one grating period. However, preferably a continuous laser is used, whereby the interference pattern is caused to move in accordance with the fiber during certain time periods. Between such time periods, the pattern is rapidly reversed to the starting point so as to continue the grating writing. Hence, a generally un-interrupted writing process is achieved. Such movement of the interference pattern may be achieved by alteration of the phase difference between the beams, e.g. by displacing mirrors in the beam path.

In a preferred embodiment of the invention, the fiber 1 to be exposed is placed in a fiber holder 2 mounted on an airbearing born carriage 3, which is translated by a feedback-controlled linear drive. The position of the translator stage relative the UV interference pattern is measured with a heterodyne interference detection system 4 utilizing a He-Ne laser as light source. The resulting spatial resolution is approximately 0.6 nm, available over the translation length of about half a meter.

A light source 5, e.g. a frequency-doubled argon-ion laser emits light, such as 100-mW radiation of wavelength 244 nm, into a beam splitter, such as a half transparent mirror or prism, or a phase-mask, where it is divided into two coherent beams. Thereafter, the beams are launched into a projection system, such as a double Sagnac interferometer 6, which generates the interference pattern forming the grating. In the projection system, one or several cylindrical lenses focus the two interfering beams into a line focus that coincides with the core of the fiber 1. Longitudinally, the focus could extend over about 100 microns, which roughly corresponds to 200 fringes for a Bragg wavelength of 1550 nm resonance wavelength.

The apparatus is controlled by a control unit 8, which e.g. could be electronically implemented in hardware. This control unit could in turn be controlled by a software control unit 7, such as an conventional personal computer.

Preferably, first displacing means 61 are provided, comprising e.g. a step motor, for controlling the angle between the interfering beams in a plane comprising the fiber. This could be used to change the period of the interference fringes to match the desired local pitch of the grating. The angle change is preferably performed symmetrically for both beams so that the center fringe does not move its position. In a preferred setup, the resolution for this pitch variation is about 1.4 pm in resonant wavelength. Hereby, the chirp or distance between individual grating elements could be accurately controlled.

In order to prevent unwanted exposure outside the actual grating, the system preferably also comprises a controllable shutter 9 in the UV beam path that is only open within the grating region during the writing.

Introduction of Controlled Blazing

According to the invention, the writing system further comprises means 62 for focusing the beams so that each one of said beams is brought into a line focus, which coincides with the core of the fiber. Said means for focusing the beams further comprises means for rotating the plane comprising the two light beams relative to the fiber, at least in the vicinity of the fiber, to provide a second angle relative to the fiber direction, said rotation giving rise to a blazing angle of the photo-induced grating elements. However, the line focus is still maintained during said rotation.

The rotation could be provided by second displacing means 63 for displacing the beams, and preferably in a direction being oblique relative to the fiber direction, and most preferably in a direction essentially perpendicular to the fiber direction.

In a first embodiment, as illustrated in FIGS. 1 and 2, the rotation is provided by a lens 621, whereby the beam incidence position on said lens is displaceable for at least one of the beams. In FIG. 2, the beams are not displaced, whereas they are displaced in FIG. 3. The displacement could be provided by displaceable or rotatable mirrors 622 arranged in the beam path. Hereby, the beams may be parallax displaced. However, as will be appreciated by someone skilled in the art, other means for displacing the beams are conceivable as well.

The displacement of the beams does not influence the focusing of the beams on the fiber. However, the beams being displaced provides an angle between the beams in a plane perpendicular to the fiber direction, as is illustrated in FIG. 3*b*. Hence, the grating being photo-induced will be slanted, i.e. blazed, in a plane comprising the fiber but being perpendicular to the plane illustrated in FIG. 3*a*.

According to an alternative embodiment, as is illustrated in FIG. 4, the rotation is provided by a curved mirror 623, whereby the beam incidence position on said mirror is displaceable for at least one of the beams. The displacement could be provided in the same way as is discussed above. Accordingly, the grating being photo-induced will be slanted, i.e. blazed, in a plane comprising the fiber but being perpendicular to the plane illustrated in FIG. 4*a*, as is illustrated in FIG. 4*c*.

The displacement is preferably performed on both beams, and most preferably in an essentially symmetrical fashion.

CONCLUSIONS

The invention provides a novel technique for fabrication of high quality blazed fiber Bragg gratings. By the inventive method, a precisely controllable blazing may be introduced, without tilting the projection system relative to the fiber or the like. As a result, the fabrication time for all kinds of customized gratings is greatly reduced as compared to earlier methods. The invention further allows for a very precise control of the grating formation, and especially the introduction of blazing.

The invention has now been described by way of embodiments. However, many alternatives are possible. For example, different types of beam splitters are feasible, other types of means for translating the fiber could be used etc. Further, other means for displacing the beams are feasible. Such alternatives are known from the prior art. It should be appreciated by someone skilled in the art that such alternatives are part of the invention, such as it is defined by the appended claims.

The invention claimed is:

1. A method for photo-inducing a blazed grating in an optical fiber, comprising:
   simultaneously exposing the fiber with two mutually coherent light beams which intersect with a first angle in a plane comprising the beams and which interfere in a predetermined region of the fiber so as to create an interference pattern along a longitudinal axis of the fiber, wherein each one of said beams is brought into a line focus, which coincides with the core of the fiber, and wherein said plane comprising the beams, at least in the vicinity of the fiber, is rotated to provide a second angle relative to the fiber direction, said rotation giving rise to a blazing angle of the photo-induced grating elements.

2. The method according to claim 1, wherein the beams are focused on the fiber by at least one cylindrical lens and the rotation of the beam plane is achieved by displacement of at least one of the beam incidence positions on said lens.

3. The method according to claim 2, wherein the beam incidence position is displaced in a direction essentially perpendicular to the fiber direction.

4. The method according to claim 2, wherein the incidence positions of both beams are displaced.

5. The method according to claim 4, wherein the incidence positions are displaced essentially symmetrically.

6. The method according to claim 1, wherein the beams are focused on the fiber by at least one curved mirror and rotation of the beam plane is achieved by displacement of at least one of the beam incidence positions on said mirror.

7. The method according to claim 6, wherein the beam incidence position is displaced in a direction essentially perpendicular to the fiber direction.

8. The method according to claim 6, wherein the incidence positions of both beams are displaced.

9. The method according to claim 8, wherein the incidence positions are displaced essentially symmetrically.

10. The method according to claim 1, wherein the fiber is translated through the exposure area where the beams intersect.

11. An apparatus for photo-inducing a blazed grating in an optical fiber, comprising:
   a source for emitting light;
   a beam splitter for forming two mutually coherent light beams;
   a fiber holder for holding the fiber during exposure; and
   a projection system for making the beams intersect with a first angle in the exposure area and thereby to interfere in a predetermined region of the fiber so as to create an interference pattern along the longitudinal axis of the fiber, wherein the projection system further comprises means for focusing the beams so that each one of said beams is brought into a line focus, which coincides with the core of the fiber, said means for focusing the beams further comprising means for rotating the plane comprising the two light beams relative to the fiber, at least in the vicinity of the fiber, to provide a second angle relative to the fiber direction, said rotation giving rise to a blazing angle of the photo-induced grating elements.

12. The apparatus according to claim 11, wherein the means for focusing the beams comprises at least one lens for focusing the beams on the fiber, the means for rotating the beam plane comprising means for displacing the beam incidence position on said lens for at least one of the beams.

13. The apparatus according to claim 12, wherein the means for displacing the beam incidence position comprises at least one reflecting mirror, which is at least one of displaceable and rotatable, arranged in the beam path for said beam.

14. The apparatus according to claim 12, wherein the means for displacing the beam incidence position on said lens is adapted to displace the incidence positions of both beams.

15. The apparatus according to claim 12, wherein the means for displacing the beam incidence comprises means for parallel displacement of the beams.

16. The apparatus according to claim 11, wherein the means for focusing the beams comprises at least one curved mirror, and means for rotating the beam plane comprising means for displacing the beam incidence position on said mirror for at least one of the beams.

17. The apparatus according to claim 16, wherein the means for displacing the beam incidence position is adapted to displace the incidence position in a direction essentially perpendicular to the fiber direction.

18. The apparatus according to claim 16, wherein the means for displacing the incidence positions is adapted to displace the incidence position of both beams.

19. The apparatus according to claim 18, wherein the means for displacing the incidence positions displaces the incidence positions of the beams essentially symmetrically.

20. The apparatus according to claim 11, further comprising:
   means for moving the fiber essentially in the direction of a longitudinal axis of the fiber through the exposing area where the beams intersect.

21. The method according to claim 3, wherein the incidence positions of both beams are displaced.

22. The method according to claim 7, wherein the incidence positions of both beams are displaced.

23. The apparatus according to claim 13, wherein the means for displacing the beam incidence position on the lens is adapted to displace the incidence positions of both beams.

24. The apparatus according to claim 13, wherein the means for displacing the beam incidence includes means for parallel displacement of the beams.

25. The apparatus according to claim 14, wherein the means for displacing the beam incidence includes means for parallel displacement of the beams.

26. The apparatus according to claim 17, wherein the means for displacing the incidence positions is adapted to displace the incidence position of both beams.

* * * * *